(12) United States Patent
Wang et al.

(10) Patent No.: US 12,254,674 B2
(45) Date of Patent: Mar. 18, 2025

(54) METHOD FOR RECOGNIZING ARTERIES AND VEINS ON A FUNDUS IMAGE USING HYPERSPECTRAL IMAGING TECHNIQUE

(71) Applicant: National Chung Cheng University, Minsyong Township, Chiayi County (TW)

(72) Inventors: Hsiang-Chen Wang, Minsyong Township, Chiayi County (TW); Yu-Ming Tsao, Minsyong Township, Chiayi County (TW); Yong-Song Chen, Minsyong Township, Chiayi County (TW); Yu-Sin Liu, Minsyong Township, Chiayi County (TW); Shih-Wun Liang, Minsyong Township, Chiayi County (TW)

(73) Assignee: National Chung Cheng University, Minsyong Township (TW)

( * ) Notice: Subject to any disclaimer, the term of this patent is extended or adjusted under 35 U.S.C. 154(b) by 354 days.

(21) Appl. No.: 17/871,195

(22) Filed: Jul. 22, 2022

(65) Prior Publication Data
US 2023/0306720 A1 Sep. 28, 2023

(30) Foreign Application Priority Data
Mar. 23, 2022 (TW) .................................. 111110879

(51) Int. Cl.
*G06V 10/772* (2022.01)
*G06T 7/00* (2017.01)
*G06V 40/18* (2022.01)

(52) U.S. Cl.
CPC .......... *G06V 10/772* (2022.01); *G06T 7/0012* (2013.01); *G06V 40/193* (2022.01);
(Continued)

(58) Field of Classification Search
CPC . G06T 2207/10024; G06T 2207/30041; G06T 2207/30101; G06T 7/0012;
(Continued)

(56) References Cited

U.S. PATENT DOCUMENTS

2017/0039689 A1* 2/2017 Solanki ................ A61B 3/0025

FOREIGN PATENT DOCUMENTS

| CN | 109615614 B | * | 8/2020 | ............... G06K 9/38 |
| JP | 2002269539 A | | 9/2002 | |
| JP | 2010233916 A | | 10/2010 | |

OTHER PUBLICATIONS

Yao, Hsin-Yu, et al. "Hyperspectral ophthalmoscope images for the diagnosis of diabetic retinopathy stage." Journal of Clinical Medicine 9.6 (2020): 1613. (Year: 2020).*

* cited by examiner

*Primary Examiner* — Andrae S Allison
*Assistant Examiner* — Emmanuel Silva-Avina
(74) *Attorney, Agent, or Firm* — Michael Best & Friedrich LLP (57) ABSTRACT

A method for recognizing arteries and veins on a fundus image includes: executing a pre-process operation on the fundus image, so as to obtain a pre-processed fundus image; generating a fundus spectral reflection dataset associated with pixels of the pre-processed fundus image, based on the pre-processed fundus image, and a spectral transformation matrix; obtaining a plurality of principle component scores associated with the pixels of the pre-processed fundus image, respectively; and determining, for each of the pixels of the pre-processed fundus image that has been determined as a part of a blood vessel, whether the pixel belongs to a part of an artery or a part of a vein.

8 Claims, 10 Drawing Sheets

(52) U.S. Cl.
CPC ............... *G06T 2207/30041* (2013.01); *G06T 2207/30101* (2013.01)

(58) Field of Classification Search
CPC ...... G06V 10/30; G06V 10/56; G06V 10/772; G06V 10/82; G06V 40/14; G06V 40/193
USPC ........................................................ 382/190
See application file for complete search history.

METHOD FOR RECOGNIZING ARTERIES AND VEINS ON A FUNDUS IMAGE USING HYPERSPECTRAL IMAGING TECHNIQUE

CROSS-REFERENCE TO RELATED APPLICATION

This application claims priority of Taiwanese Patent Application No. 111110879, filed on Mar. 23, 2022.

FIELD

The disclosure relates to a method for recognizing arteries and veins on a fundus image using hyperspectral imaging technique.

BACKGROUND

Nowadays, diabetes has become one of the most common public health problems. Based on the records of the international Diabetes Federation (IDF), in 2014, approximately 8.4 percent of the global population are afflicted with diabetes (387 million), and the number of people with diabetes is projected to grow to over 590 million in the next 25 years. One of the medical conditions attributed to diabetes is diabetic retinopathy (DR), in which damages occurs to blood vessels, causing blood leakage or other symptoms. In earlier stages, DR comes with little symptoms, and may have already developed into later stages when the vision of the patients starts to be impaired. As a result, discovering the DR in early stages is important.

Currently, the diagnosis of DR is done using eye examination such as fundus examination, which employs fundus photography to obtain fundus images. By examining the fundus images, ophthalmologists are able to determine whether a patient has DR and the severity of the DR.

It is important to recognize the blood vessels, including arteries and veins, on the fundus images for the diagnosis of DR and for subsequent determination of an oxygen saturation inside the blood vessels. Conventionally, the blood vessels are located and recognized (as one of the arteries and veins) based on colors of the fundus images. It is noted that such a manner may be affected by the quality of the fundus images and the potential human errors.

SUMMARY

Therefore, one object of the disclosure is to provide a method that is configured to automatically recognize arteries and veins on a fundus image.

According to one embodiment of the disclosure, the method for recognizing arteries and veins on a fundus image is implemented using a computer device executing a software application program and comprising steps of:

a) executing a pre-process operation on the fundus image, so as to obtain a pre-processed fundus image;

b) generating a fundus spectral reflection dataset associated with a plurality of pixels of the pre-processed fundus image, based on the pre-processed fundus image, and a spectral transformation matrix;

c) performing a principal components analysis (PCA) operation on the fundus reflection spectral dataset, so as to obtain a plurality of principle component scores associated with the pixels of the pre-processed fundus image, respectively; and d) determining, for each of the pixels of the pre-processed fundus image that has been determined as a part of a blood vessel, whether the pixel belongs to a part of an artery or a part of a vein.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Figure 1:
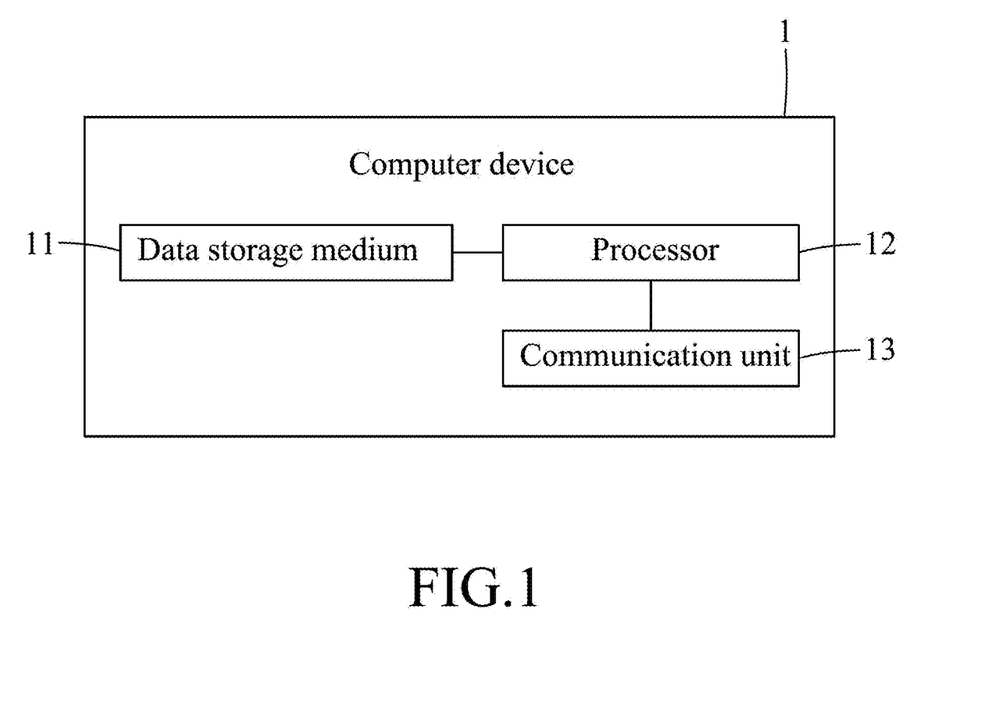
FIG. 1 is a block diagram illustrating a computer device according to one embodiment of the disclosure.

FIG. 1 is a block diagram illustrating a computer device 1 according to one embodiment of the disclosure. In this embodiment, the computer device 1 may be embodied using a server device, a personal computer, a laptop, a tablet, a mobile device, etc. The computer device 1 includes a data storage medium 11, a processor 12 connected to the data storage medium 11, and a communication unit 13.

The processor 12 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The communication unit 13 is connected to the processor 12, and may include at least one of a radio-frequency integrated circuit (RFIC), a short-range wireless communication module supporting a short-range wireless communication network using a wireless technology of Bluetooth® and/or Wi-Fi, etc., or a mobile communication module supporting telecommunication using Long-Term Evolution (LTE), the third generation (3G) and/or fifth generation (5G) of wireless mobile telecommunications technology, and/or the like.

The data storage medium 11 is connected to the processor 12, and may be embodied using computer-readable storage medium such as hard disk drive(s), random access memory (RAM), read only memory (ROM), programmable ROM (PROM), firmware, flash memory, etc.

In this embodiment, the data storage medium 11 stores a software application program, a reference color image of a reference object, a reflection spectral dataset associated with the reference object, and at least one fundus image of a patient.

The software application program includes instructions that, when executed by the processor 12, cause the processor 12 to perform a number of operations as described in the subsequent paragraphs.

Figure 10:
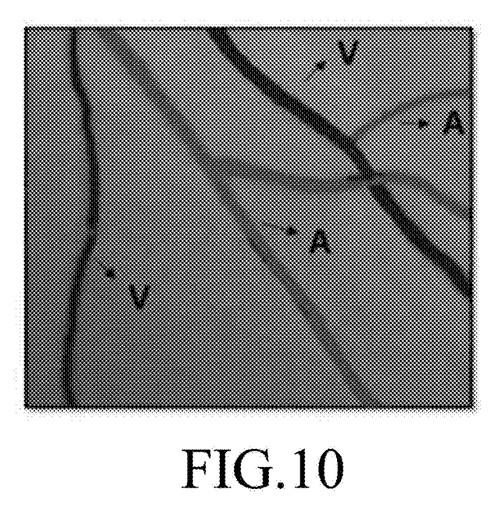
FIG. 10 illustrates a partially enlarged view of the fundus image of FIG. 9, where the arteries and veins are labeled.

The term "fundus image" refers to as an image of an interior surface of an eye of a patient opposite to the crystalline lens. The fundus image may typically obtained using fundus photography, which involves using a specialized fundus camera. In this embodiment, the Kowa Nonmyd 7 Retinal Camera is employed to obtain the fundus image. FIG. 10 is an exemplary fundus image according to one embodiment of the disclosure, associated with an eye from a patient without DR (i.e., a normal eye). In some embodiments, the computer device 1 may be connected to the specialized fundus camera via the communication unit 13 to obtain the fundus image. In some embodiments, the computer device 1 may be connected to an external electronic device (e.g., a remote server, an external data storage such as a flash drive, etc.) via the communication unit 13 to obtain the fundus image from the external electronic device. The fundus image may then be stored in the data storage medium 11.

The reference object may be X-Rite ColorChecker® Classic, which includes twenty-four color squares with twenty-four common natural colors (e.g., blue, green, red, grey), respectively. The reference color image may be captured using the fundus camera, and may be in the form of an 8-bit color image expressed using a standard red, green, blue (sRGB) color space. Both the fundus image and the reference color image may be sRGB images in the form of Joint Photographic Experts Group (.jpeg) image, but is not limited to such.

The reflection spectral dataset may include spectral data (spectrum) of light reflected by the reference object and measured by, for example, a spectrometer. The spectrometer may be embodied using, for example, Ocean Optics QE65000 Spectrometer.

In some embodiments, the reflection spectral dataset may be obtained from the public resource provided by the Munsell Color Science Laboratory of Rochester Institute of Technology (RIT).

In use, it may be desired to analyze the fundus image to identify a number of features on the fundus image, in order to expedite the diagnosis of potential diabetic retinopathy (DR) of the patient. Specifically, it is desired to recognize the blood vessels, including arteries and vein, on the fundus image for the diagnosis of DR and for subsequent determination of an oxygen saturation inside the blood vessels.

According to one embodiment of the disclosure, a method for recognizing arteries and veins on a fundus image using hyperspectral imaging technique is provided. The method may include a matrix calculating process and a recognition process.

Figure 2:
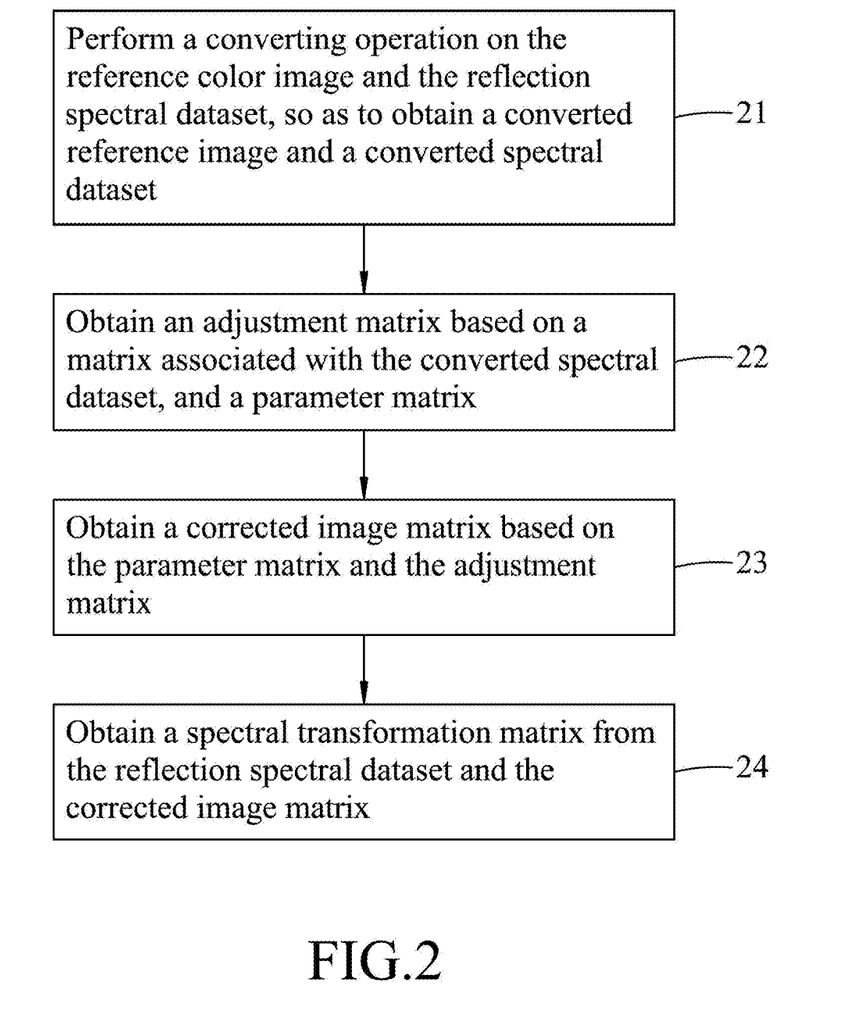
FIG. 2 is a flow chart illustrating steps of a matrix calculating process in a method for recognizing arteries and veins on a fundus image according to one embodiment of the disclosure.

FIG. 2 is a flow chart illustrating steps of the matrix calculating process according to one embodiment of the disclosure. The matrix calculating process may be implemented by the processor 12 executing the software application program.

In step 21, the processor 12 performs a converting operation on the reference color image and the reflection spectral dataset to convert the same to a CIE 1931 XYZ color space created by the International Commission on Illumination (CIE) in 1931, so as to obtain a converted reference image and a converted spectral dataset corresponding to the reference color image and the reflection spectral dataset, respectively.

Specifically, the converting operation includes, with respect to the reference color image, obtaining the converted reference image using the following equations:

$$\begin{bmatrix} X_C \\ Y_C \\ Z_C \end{bmatrix} = [M_A][T] \begin{bmatrix} f(R_{sRGB}) \\ f(G_{sRGB}) \\ f(B_{sRGB}) \end{bmatrix} \times 100, \quad 0 \le \begin{matrix} R_{sRGB} \\ G_{sRGB} \\ B_{sRGB} \end{matrix} \le 1;$$

$$T = \begin{bmatrix} 0.4104 & 0.3576 & 0.1805 \\ 0.2126 & 0.7152 & 0.0722 \\ 0.0193 & 0.1192 & 0.9505 \end{bmatrix};$$

$$f(n) = \begin{cases} \left(\dfrac{n + 0.055}{1.055}\right)^{2.4}, & n > 0.04045 \\ \left(\dfrac{n}{12.92}\right), & \text{otherwise} \end{cases}; \text{ and}$$

$$[M_A] = \begin{bmatrix} X_{SW}/X_{CW} & 0 & 0 \\ 0 & Y_{SW}/Y_{CW} & 0 \\ 0 & 0 & Z_{SW}/Z_{CW} \end{bmatrix},$$

where $X_C$, $Y_C$ and $Z_C$ represent an X value, an Y value and a Z value of a pixel of the converted reference image in the CIE 1931 XYZ color space; $R_{sRGB}$, $G_{sRGB}$ and $B_{sRGB}$ represent a red value, a green value and a blue value of a pixel of the reference color image in the sRGB color space, wherein said pixel of the reference color image corresponds to the pixel of the converted reference image; $X_{CW}$, $Y_{CW}$ and $Z_{CW}$ represent a red value, a green value and a blue value of a white point that defines the white color in the sRGB color space and that is captured under the CIE standard illuminant D65); $X_{SW}$, $Y_{SW}$ and $Z_{SW}$ represent a white point for an environmental illuminant under which the reference color image was captured; and $[M_A]$ represents a chromatic adaptation matrix. The white point is a set of tristimulus values or a set of chromaticity coordinates.

It is noted that, since the environmental illuminant used for capturing the reference color image may be one other than the standard illuminant in the sRGB color space, the chromatic adaptation matrix $[M_A]$ is employed for converting the white point for the standard illuminant to a corresponding white point for the environmental illuminant of the reference color image.

The converting operation also includes, with respect to the reflection spectral dataset, obtaining the converted spectral dataset using the following equations:

$$X_s = k\int_{380nm}^{780nm} S(\lambda)R(\lambda)\bar{x}(\lambda)d\lambda$$

$$Y_s = k\int_{380nm}^{780nm} S(\lambda)R(\lambda)\bar{y}(\lambda)d\lambda$$

$$Z_s = k\int_{380nm}^{780nm} S(\lambda)R(\lambda)\bar{z}(\lambda)d\lambda; \text{ and}$$

$$k = 100/\int_{380nm}^{780nm} S(\lambda)\bar{y}(\lambda)d\lambda'$$

where, for each wavelength $\lambda$ of the spectrum of the reflection spectral dataset (having a range between 380 to 780 nanometers), $X_S$, $Y_S$ and $Z_S$ represent an X value, a Y value and a Z value of the converted spectral dataset in the CIE 1931 XYZ color space for the spectral value corresponding to the wavelength $\lambda$ of the spectrum of the reflection spectral dataset, $S(\lambda)$ M represents a spectral value corresponding to the wavelength $\lambda$ in a spectrum of the environmental illuminant under which the reference color image was captured, $R(\lambda)$ represents the spectral value corresponding to the wavelength A of the spectrum of the reflection spectral dataset of the reference object, and $\bar{x}(\lambda)$, $\bar{y}(\lambda)$ and $\bar{z}(\lambda)$ represent color matching functions of the CIE 1931 XYZ color space.

It is noted that the converting operation as described above is performed in a pixel-to-pixel basis.

In step 22, the processor 12 obtains an adjustment matrix based on a matrix associated with the converted spectral dataset, and a parameter matrix. Specifically, the adjustment matrix [C] is obtained by performing multiple regression analysis based on the following equations:

$$[C] = [A] \times \text{pinv}([B]), \text{ and}$$

$$[B] = [1, R, G, B, RG, GB, BR, R^2, G^2, B^2, RGB, R^3, G^3, B^3, RG^2, RB^2, GR^2, GB^2, BR^2, BG^2]^T$$

where [A] is the matrix containing the X, Y and Z values of the converted spectral dataset in the CIE 1931 XYZ color space, pinv([B]) represents an inverse matrix of the parameter matrix, and R, G and B respectively represent a red value, a green value and a blue value of a pixel of the reference color image.

Specifically, the parameter matrix [B] is used to correct errors attributed to a number of factors that are associated with the camera used to capture the reference color image. In this embodiment, the factors involved include a non-linear response of the camera, a dark current associated with the camera, a deviation of a color filter of the camera, and a color shift of the camera (e.g., white balance (WB)). One or more matrices may be used to express correction parameters for correcting one or more of the above mentioned factors. Afterward, the parameter matrix may be obtained based on the one or more matrices for the above mentioned factors.

In step 23, the processor 12 obtains a corrected image matrix based on the parameter matrix and the adjustment matrix. Specifically, the processor 14 obtains the corrected image using the following equation:

$$[\beta] = [C] \times [B]$$

where $[\beta]$ is the corrected image matrix containing X values, Y values and Z values of all pixels of a corrected image in the CIE 1931 XYZ color space. Using the above operation, the pixel values of the pixels that constitute the corrected image may be obtained, and the processor 12 is may be programmed to generate the corrected image accordingly.

Figure 3:
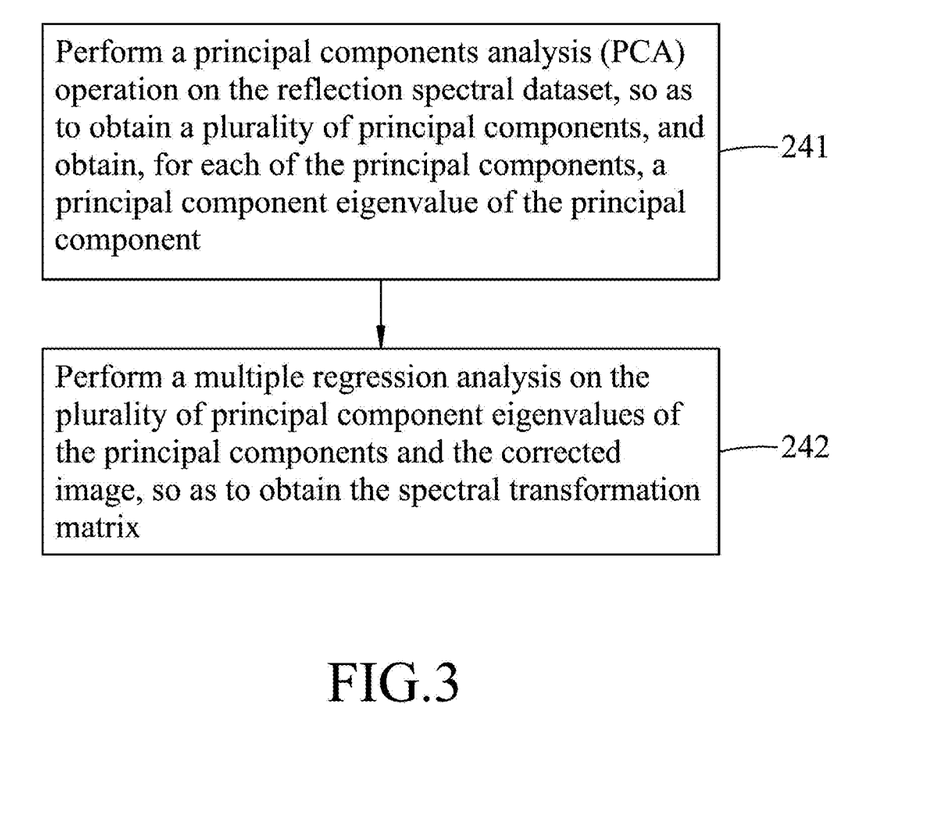
FIG. 3 is a flow chart illustrating sub-steps of operations for obtaining a spectral transformation matrix according to one embodiment of the disclosure.

In step 24, the processor 12 obtains a spectral transformation matrix from the reflection spectral dataset and the corrected image matrix. Specifically, FIG. 3 is a flow chart illustrating sub-steps of operations in step 24 according to one embodiment of the disclosure.

In sub-step 241, the processor 12 performs a principal components analysis (PCA) operation on the reflection spectral dataset, so as to obtain a plurality of principal components, and obtain, for each of the principal components, a principal component eigenvalue of the principal component. In this embodiment, twelve principal component eigenvalues of twelve principal components are obtained but other numbers of principal component eigenvalues may be employed in other embodiments.

In sub-step 242, the processor 12 performs a multiple regression analysis on the plurality of principal component eigenvalues of the principal components and the corrected image, so as to obtain the spectral transformation matrix.

Specifically, the operation of sub-step 242 includes using the following equation to obtain the spectral transformation matrix M:

$$[M] = [\alpha] \times \text{pinv}([B])$$

where $[\alpha]$ is a matrix that contains the plurality of principal component eigenvalues.

With the spectral transformation matrix, it is then possible to perform the recognizing of arteries and veins on the fundus image, employing the spectral transformation matrix.

Figure 4:
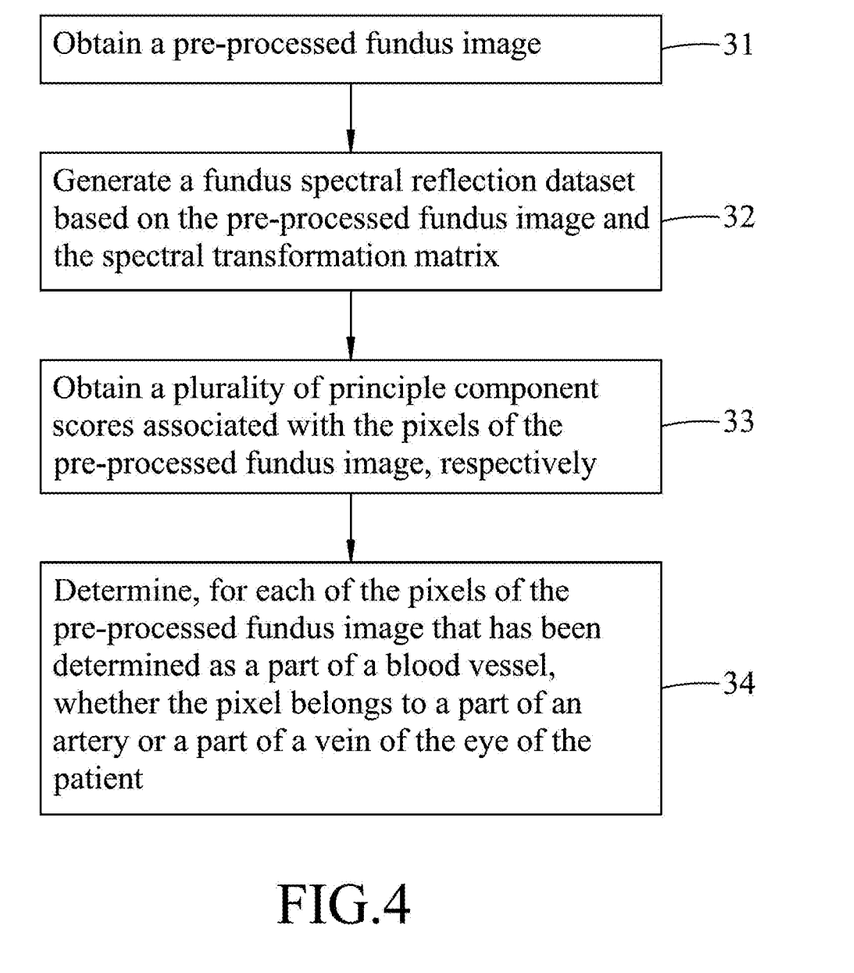
FIG. 4 is a flow chart illustrating steps of a recognition process of the method according to one embodiment of the disclosure.

FIG. 4 is a flow chart illustrating steps of the recognition process of the method according to one embodiment of the disclosure. In this embodiment, the recognition process is implemented using the processor 12 executing the software application program.

In step 31, the processor 12 executes a pre-process operation on the fundus image, so as to obtain a pre-processed fundus image for further processing. In some embodiments, the pre-process operation includes a background removal operation. It is noted that the pre-process operation on the fundus image is necessary because the blood vessels in the fundus image have a darker appearance relative to the damaged tissues of the eye. As such, by removing the background, the blood vessels in the fundus image may be distinguished in the pre-processed fundus image.

Figure 5:
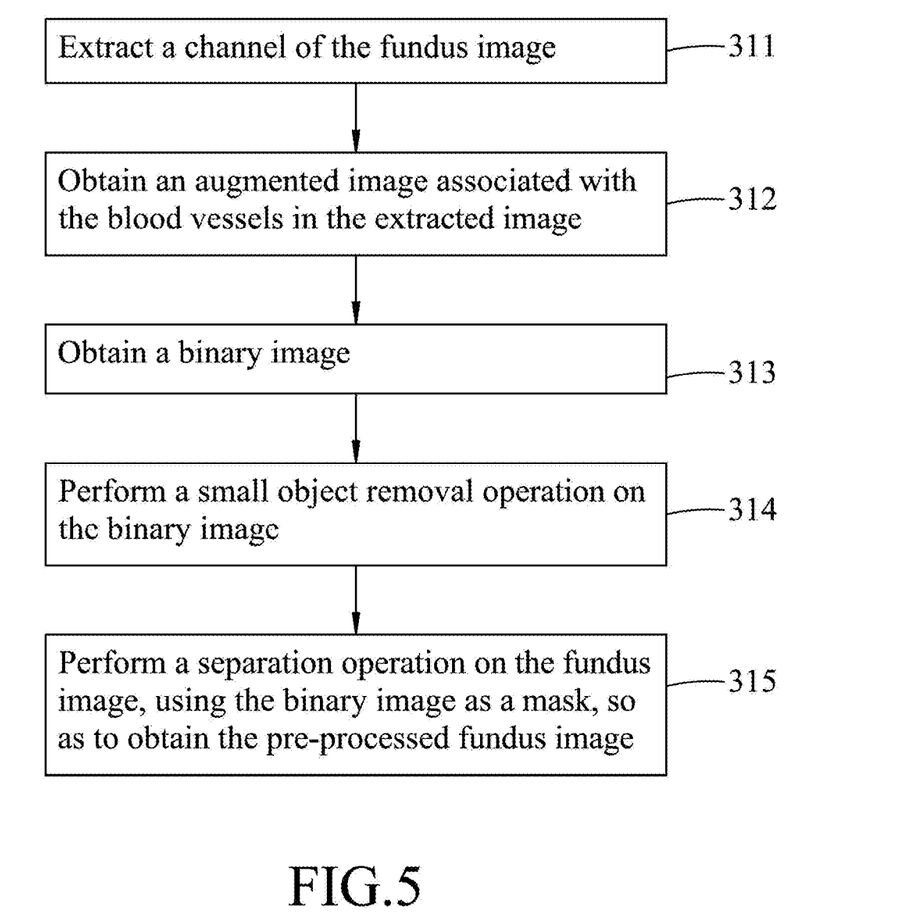
FIG. 5 is a flow chart illustrating sub-steps of an exemplary execution of a pre-process operation on the fundus image according to one embodiment of the disclosure.

FIG. 5 is a flow chart illustrating sub-steps of an exemplary implementation of step 31 according to one embodiment of the disclosure.

In sub-step 311, the processor 12 performs an extraction operation to extract a channel (i.e., a certain component) of the fundus image. Specifically, in this embodiment, the fundus image is an sRGB image that includes three channels (red, green, blue), and in sub-step 311, the processor 12 extracts, for example, the green channel of the fundus image, so as to obtain an extracted image. In some embodiments, the extracted image may be then converted to a grayscale image.

It is noted that in this embodiment, the extraction operation is done with respect to the green channel because the green channel in the sRGB image typically has a higher contrast relative to other channels, but is not limited to such.

In sub-step 312, the processor 12 performs a filtering operation on the extracted image, so as to obtain an augmented image associated with the blood vessels in the extracted image.

Specifically, a two-dimensional (2D) linear filter may be employed for feature extraction in sub-step 312. In this embodiment, a 2D Gabor filter is employed, and in sub-step 312, the processor 12 applies the extracted image to the 2D Gabor filter as an input, and obtains the augmented image as an output. It is noted that the operations of the 2D Gabor filter are known in the related art, and details thereof are omitted herein for the sake of brevity.

In sub-step 313, the processor 12 performs a thresholding operation on the augmented image to obtain a binary image.

Specifically, in this embodiment, a threshold value (a grayscale value between 0 and 255) to be used in the thresholding operation is selected so as to effectively distinguish the blood vessels from the background, while reducing the effect of background and noise.

The selection of the threshold value may be done using an iteration selection method. For example, in this embodiment, a method as disclosed in the document "Picture Thresholding Using an Iterative Selection Method", T. W. Ridler and S. Calvard, may be implemented for selecting the threshold value. Using the selected threshold value, the thresholding operation may be executed to obtain the binary image.

In sub-step 314, the processor 12 performs a small object removal operation on the binary image.

Specifically, in this embodiment, the processor 12 executes a Matlab function named "bwareaopen" to remove small objects each being considered to be connected to the blood vessels (i.e., in contact with the blood vessels) and each consisting of a number of pixels fewer than a specific number of pixels. In this manner, small white objects resulted from noise or other defects of the fundus image, such as unbalanced brightness of the fundus image, may be removed.

Figure 11:
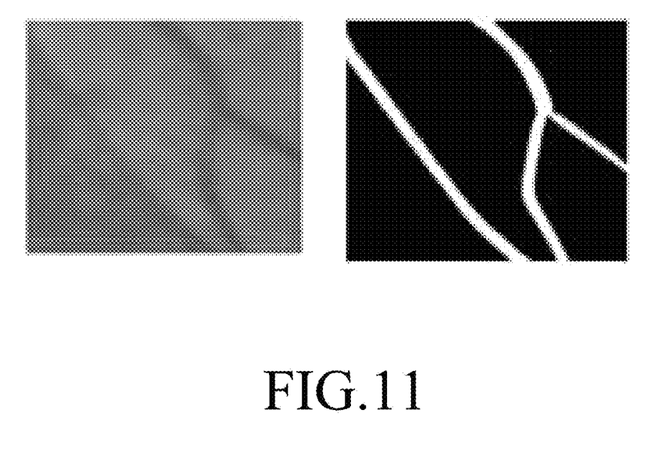
FIG. 11 illustrates a part of an exemplary fundus image and a corresponding binary image according to one embodiment of the disclosure.

Then, in sub-step 315, the processor 12 performs a separation operation on the fundus image, using the binary image as a mask, so as to obtain the pre-processed fundus image. Specifically, FIG. 11 illustrates a part of an exemplary fundus image and a corresponding binary image obtained after sub-step 314 according to one embodiment of the disclosure. It is noted that in this embodiment, the white pixels of the binary image represent a part of a blood vessel, and the black pixels of the binary image represent other parts of the eye (and considered as a part of background).

In sub-step 315, the processor 12 may perform the separation operation by superimposing the corresponding binary image on the fundus image, and removing each pixel of the fundus image that is overlapped with a black pixel of the binary image, leaving the pixels overlapped with white pixels of the binary image. The resulting image now only includes the blood vessels of the fundus image, and may serve as the pre-processed fundus image.

After sub-step 315, the pre-processed fundus image is obtained, and may be stored in the data storage medium 11 and used for later determination of whether a specific pixel that has been determined as a part of a blood vessel is to be recognized as a part of an artery or a part of a vein.

In step 32, the processor 12 obtains the pre-processed fundus image from the data storage medium 11, and generates a fundus spectral reflection dataset based on the pre-processed fundus image, and the spectral transformation matrix obtained in the matrix calculating process. The fundus spectral reflection dataset is associated with a plurality of pixels of the pre-processed fundus image.

Figure 6:
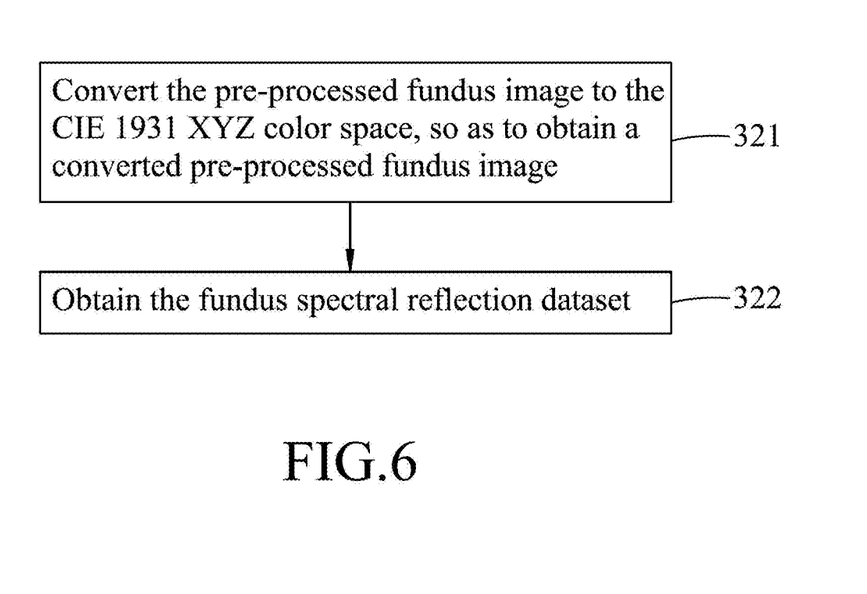
FIG. 6 is a flow chart illustrating sub-steps of operations in obtaining a fundus spectral reflection dataset according to one embodiment of the disclosure.

Specifically, FIG. 6 is a flow chart illustrating sub-steps of operations in step 32 according to one embodiment of the disclosure.

In sub-step 321, the processor 12 converts the pre-processed fundus image to the CIE 1931 XYZ color space, so as to obtain a converted pre-processed fundus image. The operations of sub-step 321 may be done in a manner similar to those of step 21, and details thereof are omitted herein for the sake of brevity.

In sub-step 322, the processor 12 obtains the fundus spectral reflection dataset using the following equation:

$$[S_{Spectrum}] = [E][M]\begin{bmatrix} X \\ Y \\ Z \end{bmatrix}$$

where $[S_{Spectrum}]$ is a matrix containing the fundus spectral reflection dataset, $[M]$ is the spectral transformation matrix, $[E]$ represents the principal component eigenvalues obtained in sub-step 241, and $$\begin{bmatrix} X \\ Y \\ Z \end{bmatrix}$$

is a matrix containing pixel values of the converted image. It is noted that the spectral reflection dataset includes data related to spectral reflection of the pixels of the pre-processed fundus image.

Then, in step 33, the processor 12 performs a PCA classification operation on the fundus reflection spectral dataset, so as to obtain a plurality of principle component scores associated with the pixels of the pre-processed fundus image, respectively.

Specifically, in this embodiment, the processor 12 applies the fundus reflection spectral dataset to a pre-trained PCA neural network as an input, and obtains, as an output of the PCA neural network, the plurality of principle component scores associated with the pixels of the pre-processed fundus image, respectively. It is noted that, the PCA neural network may be trained beforehand using a number of fundus images with the arteries and veins thereon already recognized.

Then, in step 34, the processor 12 determines, for each of the pixels of the pre-processed fundus image that has been determined as a part of a blood vessel, whether the pixel belongs to a part of an artery or a part of a vein of the eye of the patient.

Specifically, the operations of step 34 is performed based on the plurality of principle component scores associated with the pixels of the pre-processed fundus image.

Figure 7:
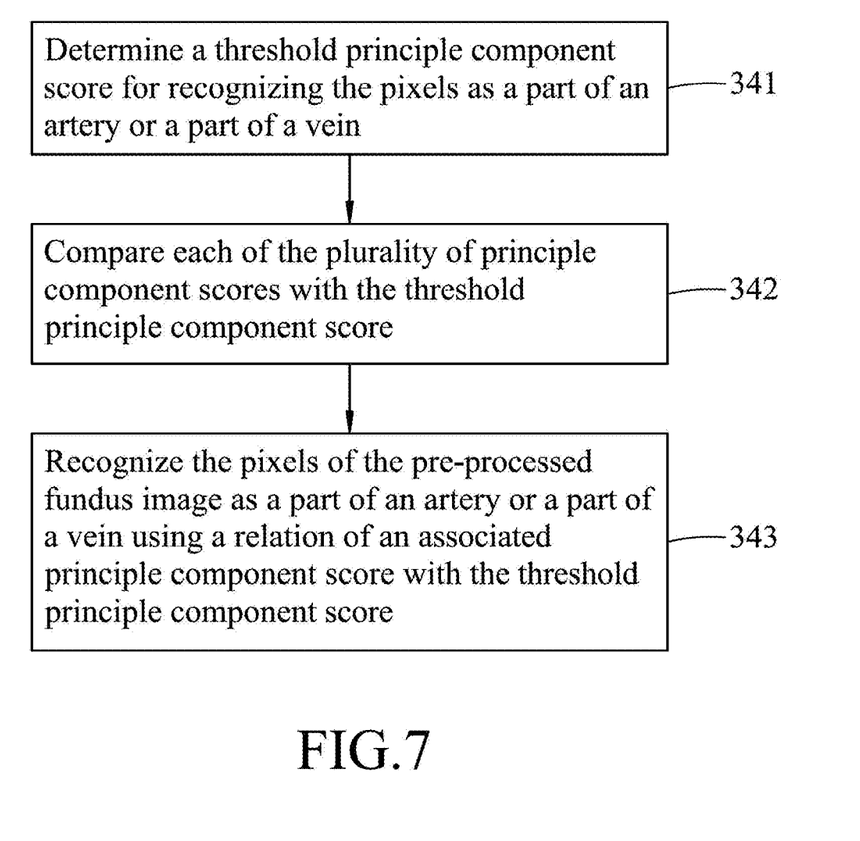
FIG. 7 is a flow chart illustrating sub-steps of an exemplary implementation of determining whether a pixel belongs to a part of an artery or a part of a vein of the eye of the patient according to one embodiment of the disclosure.

FIG. 7 is a flow chart illustrating sub-steps of an exemplary implementation of step 34 according to one embodiment of the disclosure.

In sub-step 341, the processor 12 determines a threshold principle component score for recognizing the pixels as a part of an artery or a part of a vein.

Figure 8:
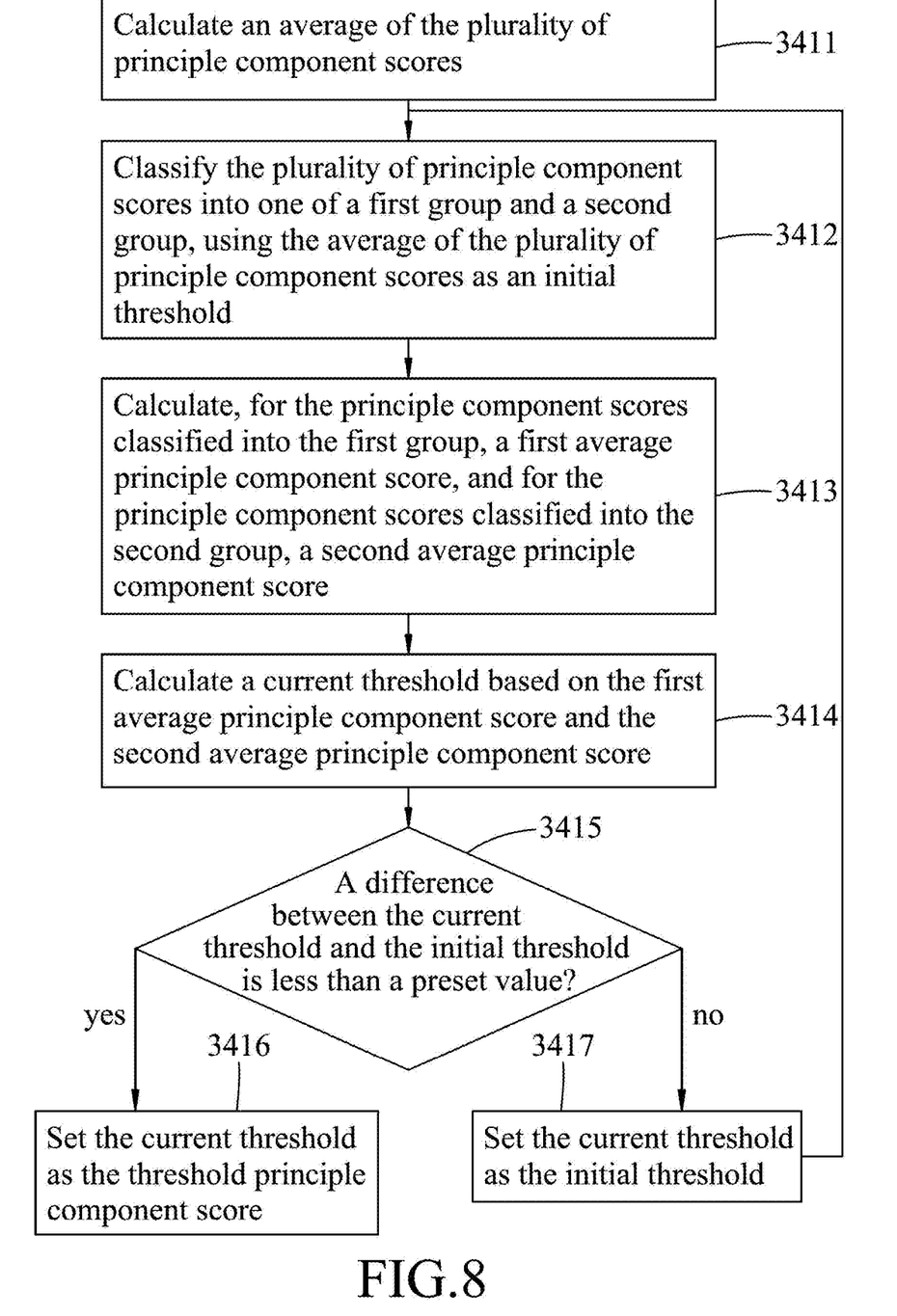
FIG. 8 is a flow chart illustrating sub-steps of an exemplary implementation of determining a threshold principle component score for recognizing the pixels as a part of an artery or a part of a vein according to one embodiment of the disclosure.

FIG. 8 is a flow chart illustrating sub-steps of an exemplary implementation of sub-step 341 according to one embodiment of the disclosure.

In sub-step 3411, the processor 12 calculates an average of the plurality of principle component scores.

In sub-step 3412, the processor 12 classifies the plurality of principle component scores into one of a first group and a second group, using the average of the plurality of principle component scores as an initial threshold. For example, the principle component scores higher than the average of the plurality of principle component scores may be classified into the first group, and the principle component scores lower than the average of the plurality of principle component scores may be classified into the second group.

In sub-step 3413, the processor 12 calculates, for the principle component scores classified into the first group, a first average principle component score, and for the principle component scores classified into the second group, a second average principle component score.

In sub-step 3414, the processor 12 calculates a current threshold based on the first average principle component score and the second average principle component score. In some embodiments, the current threshold is calculated by averaging the first average principle component score and the second average principle component score.

In sub-step 3415, the processor 12 determines whether a difference between the current threshold and the initial threshold (a result of the initial threshold minus the current threshold) is less than a preset value. When it is determined that the difference is less than the preset value, the flow proceeds to step 3416, in which the processor 12 sets the current threshold as the threshold principle component score. Otherwise, the flow proceeds to step 3417, in which the processor 12 sets the current threshold as the initial threshold, and then the flow goes back to sub-step 3412 to repeat the operations, until the difference becomes less than the preset value.

After the threshold principle component score is determined, in sub-step 342, the processor 12 compares each of the plurality of principle component scores with the threshold principle component score.

Then, in sub-step 343, the processor 12 recognizes the pixels of the pre-processed fundus image as a part of an artery or a part of a vein using a relation of an associated principle component score with the threshold principle component score. Specifically, in this embodiment, the pixels of the pre-processed fundus image with the principle component scores that are greater than the threshold principle component score are recognized as a part of an artery, and the pixels of the pre-processed fundus image with the principle component scores that are less than equal to the threshold principle component score are identified as a part of a vein.

Afterward, the result of step 34 may be applied back to the original fundus image, so as to label the arteries and veins of the eye on the fundus image.

Figure 9:
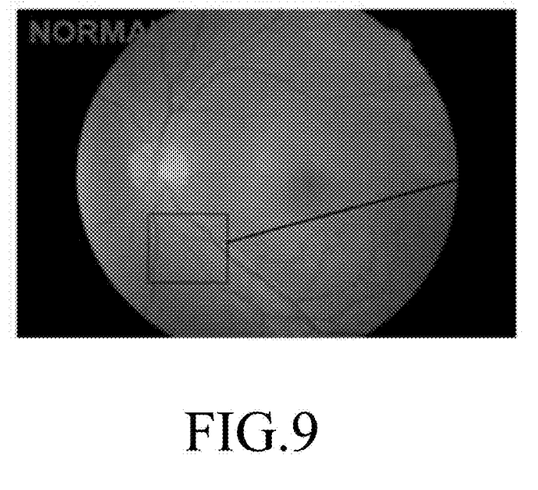
FIG. 9 is an exemplary fundus image according to one embodiment of the disclosure

FIG. 10 illustrates a partially enlarged view of the fundus image of FIG. 9. In the partially enlarged view, the arteries and veins are labeled as "A" and "V", respectively.

To sum up, embodiments of the disclosure provide a method for recognizing arteries and veins on a fundus image. In the method, a matrix calculating process is implemented to extract the accurate spectral information (e.g., the principle component scores, the principle component eigenvalues, etc.) from the reference object in the CIE 1931 XYZ color space. Also, various parameters that may cause errors in subsequent estimations are also adjusted in the spectral transformation matrix.

Afterward, the fundus image may be subjected to the pre-process operations to obtain the pre-processed fundus image. Then, a fundus spectral reflection dataset is generated based on the pre-processed fundus image using the spectral transformation matrix obtained in the matrix calculating process. Then, the fundus reflection spectral dataset is applied to a pre-trained PCA neural network as an input to obtain, as an output of the PCA neural network, a plurality of principle component scores. Using the plurality of principle component scores, the pixels of the pre-processed fundus image may be recognized as a part of an artery or a part of a vein.

The method may be used to facilitate automatic diagnosis of different variants of diabetic retinopathy, such as background diabetic retinopathy (BDR), preproliferative diabetic retinopathy (PDDR), proliferative diabetic retinopathy (PDR), etc.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for recognizing arteries and veins on a fundus image, the method being implemented using a computer device executing a software application program and comprising steps of:
   a) executing a pre-process operation on the fundus image, so as to obtain a pre-processed fundus image;
   b) generating a fundus spectral reflection dataset associated with a plurality of pixels of the pre-processed fundus image, based on the pre-processed fundus image, and a spectral transformation matrix;
   c) performing a principal components analysis (PCA) operation on the fundus reflection spectral dataset, so as to obtain a plurality of principle component scores associated with the pixels of the pre-processed fundus image, respectively; and
   d) determining, for each of the pixels of the pre-processed fundus image that has been determined as a part of a blood vessel, whether the pixel belongs to a part of an artery or a part of a vein;
   wherein step d) includes:
      determining a threshold principle component score for recognizing the pixels as a part of an artery or a part of a vein;
      comparing each of the plurality of principle component scores with the threshold principle component score; and
      recognizing the pixels of the pre-processed fundus image as a part of an artery or a part of a vein using a relation of an associated principle component score with the threshold principle component score;
      wherein the determining of the threshold principle component score includes calculating an average of the plurality of principle component scores, classifying the plurality of principle component scores into one of a first group and a second group, using the average of the plurality of principle component scores as an initial threshold;

calculating, for the principle component scores classified into the first group, a first average principle component score, and for the principle component scores classified into the second group, a second average principle component score, calculating a current threshold based on the first average principle component score and the second average principle component score, determining whether a difference between the current threshold and the initial threshold is less than a preset value, when it is determined that the difference is less than the preset value, setting the current threshold as the threshold principle component score, and when it is determined that the difference is not less than the preset value, setting the current threshold as the initial threshold, and repeating the classifying the plurality of principle component scores.

2. The method of claim 1, wherein step a) includes:

performing an extraction operation to extract a channel of the fundus image, so as to obtain an extracted image;

performing a filtering operation on the extracted image, so as to obtain an augmented image associated with blood vessels in the extracted image;

performing a thresholding operation on the augmented image to obtain a binary image which serves as the pre-processed fundus image; and performing a small object removal operation the pre-processed fundus image.

3. The method of claim 1, the computer device storing a reference color image of a reference object, and a reflection spectral dataset associated with the reference object, the method further comprising, prior to step b):

performing a converting operation on the reference color image and the reflection spectral dataset to convert the same to an International Commission on Illumination (CIE) 1931 XYZ color space, so as to obtain a converted image and a converted spectral dataset corresponding to the reference color image and the reflection spectral dataset, respectively;

obtaining an adjustment matrix based on a matrix associated with the converted spectral dataset and a parameter matrix;

obtaining a corrected image matrix based on the parameter matrix and the adjustment matrix; and obtaining the spectral transformation matrix from the reflection spectral dataset and the corrected image matrix.

4. The method of claim 3, wherein the adjustment matrix $[C]$ is obtained by performing multiple regression analysis based on the following equation:

$$[C]=[A]\times\text{pinv}([B]), \text{ and}$$

$$[B]=[1,R,G,B,RG,GB,BR,R^2,G^2,B^2,RGB,R^3,G^3,B^3,RG^2,RB^2,GR^2,GB^2,BR^2,BG^2]^T$$

where $[A]$ is the matrix containing the X, Y and Z values of the converted spectral dataset in the CIE 1931 XYZ color space, pinv($[B]$) represents an inverse matrix of the parameter matrix, and R, G and B respectively represent a red value, a green value and a blue value of a pixel of the reference color image.

5. The method of claim 3, wherein the corrected image matrix is obtained using the following equation:

$$[\beta]=[C]\times[B]$$

where $[\beta]$ is the corrected image matrix containing X values, Y values and Z values of all pixels of a corrected image in the CIE 1931 XYZ color space.

6. The method of claim 3, wherein the obtaining of the spectral transformation matrix includes:

performing a PCA operation on the reflection spectral dataset, so as to obtain a plurality of principal components, and obtain, for each of the principal components, a principal component eigenvalue of the principal component; and performing a multiple regression analysis on the plurality of principal component eigenvalues of the plurality of principal components and the corrected image, so as to obtain the spectral transformation matrix.

7. The method of claim 6, wherein the spectral transformation matrix $[M]$ is obtained using the following equation:

$$[M]=[\alpha]\times\text{pinv}([B])$$

where $[\alpha]$ is a matrix that contains the plurality of principal component eigenvalues.

8. The method of claim 7, wherein the fundus spectral reflection dataset is generated by:

converting the pre-processed fundus image to the CIE 1931 XYZ color space, so as to obtain a converted pre-processed fundus image;

obtaining the fundus spectral reflection dataset using the following equation:

$$[S_{Spectrum}] = [E][M]\begin{bmatrix} X \\ Y \\ Z \end{bmatrix}$$

where $[S_{Spectrum}]$ is a matrix containing the fundus spectral reflection dataset, $[M]$ is the spectral transformation matrix, $[E]$ represents the principal component eigenvalues, and $$\begin{bmatrix} X \\ Y \\ Z \end{bmatrix}$$

is a matrix containing pixel values of the converted image.

* * * * *